United States Patent
Gloge et al.

[11] 4,025,156
[45] May 24, 1977

[54] GRADED-INDEX FIBER FOR MULTIMODE OPTICAL COMMUNICATION

[75] Inventors: Detlef Christoph Gloge, Red Bank; Ivan Paul Kaminow, New Shrewsbury; Herman Melvin Presby, Highland Park, all of N.J.

[73] Assignee: Bell Telephone Laboratories, Incorporated, Murray Hill, N.J.

[22] Filed: Sept. 12, 1975

[21] Appl. No.: 612,625

[52] U.S. Cl. .................. 350/96 WG; 350/96 GN; 350/175 GN
[51] Int. Cl.² .......................................... G02B 5/14
[58] Field of Search ... 350/96 WG, 96 GN, 175 GN

[56] References Cited
UNITED STATES PATENTS

| | | | |
|---|---|---|---|
| 3,614,197 | 10/1971 | Nishizawa et al. | 350/96 WG |
| 3,823,997 | 7/1974 | Gloge et al. | 350/96 WG |
| 3,904,268 | 9/1975 | Keck et al. | 350/96 WG |
| 3,938,974 | 2/1976 | Macedo et al. | 350/96 WG |

OTHER PUBLICATIONS

R. Olshansky et al., "Topical Meeting on Optical Fiber Transmission, Williamsburg, Va.", Jan. 7–9, 1975, pp. TuC5-1-4.

J. B. MacChesney et al., pp. 1280–1281, Proc. IEEE, vol. 62, Sept. 1974.

Primary Examiner—John K. Corbin
Assistant Examiner—Rolf Hille
Attorney, Agent, or Firm—Wilford L. Wisner; Daniel D. Dubosky

[57] ABSTRACT

Graded-index fibers, which are the most promising for first-generation optical communication links, are improved for multimode transmission by employing two or more glassy dopants in the core mutually graded with respect to the silica host and to each other to provide simultaneously minimized intermode dispersion at a first-selected wavelength and, in addition, a broader wavelength range of minimized intermode dispersion, or minimized intermode dispersion at a second distinct wavelength pertinent to the multimode transmission, or optimization of another dispersion-related property of said fiber.

5 Claims, 4 Drawing Figures

ILLUSTRATIVE EXAMPLE $\frac{d\alpha}{d\lambda} = 0$ AT $\lambda = 800$ nm

ILLUSTRATIVE EXAMPLE $\frac{d\alpha}{d\lambda} = 0$ AT $\lambda = 800$ nm

CASE 1: $\frac{d\alpha}{d\lambda} = 0$ AT $\lambda_0$

CASE 2: $\alpha_1 = \alpha_2$ AT $\lambda_1, \lambda_2$

GRADED-INDEX FIBER FOR MULTIMODE OPTICAL COMMUNICATION

BACKGROUND OF THE INVENTION

This invention relates to waveguiding optical fibers of the type having a core in which the index of refraction varies radially.

Such waveguiding optical fibers of the so-called graded-index type are especially useful for multimode optical transmission and will probably be used in first-generation optical communication links with light-emitting diode sources or multimode semiconductive injection lasers or multimode optically pumped dielectric host rare earth ion lasers.

Typically, in the past, the radial grading of index in such fibers has been achieved by varying the concentration of one glassy dopant in the majority glassy matrix, which is usually silica, but which may also include one or more other glassy dopants as a constant-concentration background that is useful in setting the overall guiding strength of the fiber or in determining the mechanical properties of the fiber.

SUMMARY OF THE INVENTION

According to our invention, we have recognized that graded-index fibers for multimode optical transmission and communication links may be improved to achieve simultaneously the usually desirable minimized intermode dispersion and simultaneously another substantially improved dispersion-related property of the fiber. Such other properties may include, but are not limited to, a broader wavelength range of minimized intermode dispersion or minimized intermode dispersion at a second wavelength of transmission distinct from the primary wavelength of minimized intermode dispersion.

According to a feature of our invention, these advantageous properties are simultaneously achieved by grading two or more of the glassy dopants with repect to each other and with respect to the majority matrix, which may be silica, with precisely shaped variations in concentration with respect to radius.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
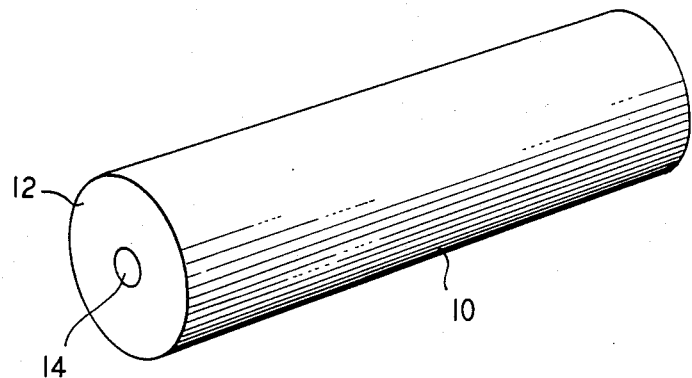
FIG. 1 is a pictorially perspective view of an optical fiber waveguide according to our invention.

While the key features characteristic of our present invention are not discernible in the perspective view of an optical fiber waveguide as shown in FIG. 1, nevertheless, that perspective view shows the type of structure to which our invention pertains.

Specifically, the optical fiber waveguide 10 includes a core 14 of radially varying index of refraction and a cladding 12, typically of substantially uniform index of refraction. In the prior art, it was typically stated that the radial variation of index of the core 14 should be essentially parabolic, that is, that the index $n$ was equal to $n_c$, the index in the cladding of the fiber times a quantity $(1+f)$ with $f(r)=\Delta[1-(r/a)^\alpha]$ in the core and $f(r)=0$ in the cladding. The radius of the core is $a$. For an inverted parabolic, $\alpha = 2$; in other words, the index decreases quadratically with radius. The constant $\Delta$ is determined so that the net index difference between the axis of the core 14 and the cladding 12 at their interface is of a previously selected value for adequate optical confinement of the lower order modes. Furthermore, the value of $r$ at the interface is selected to be large enough that the fiber was truly a multimode fiber.

More recently as disclosed in U.S. Pat. No. 3,823,997, issued July 16, 1974 to D. C. Gloge et al, it was shown that in some cases an off-parabolic grading of index is desirable. In other words, it is occasionally desirable that $\alpha$ be other than 2.

It is one aspect of our present invention that we have appreciated that different combinations of optimized dispersion-related properties can be achieved by causing $\alpha$ to have a certain wavelength dependence such as is readily and advantageously achieved by grading two or more glassy dopants in concentration in the core 14 from the axis outward with respect to each other and with respect to the majority fused silica ($SiO_2$).

Figure 2:
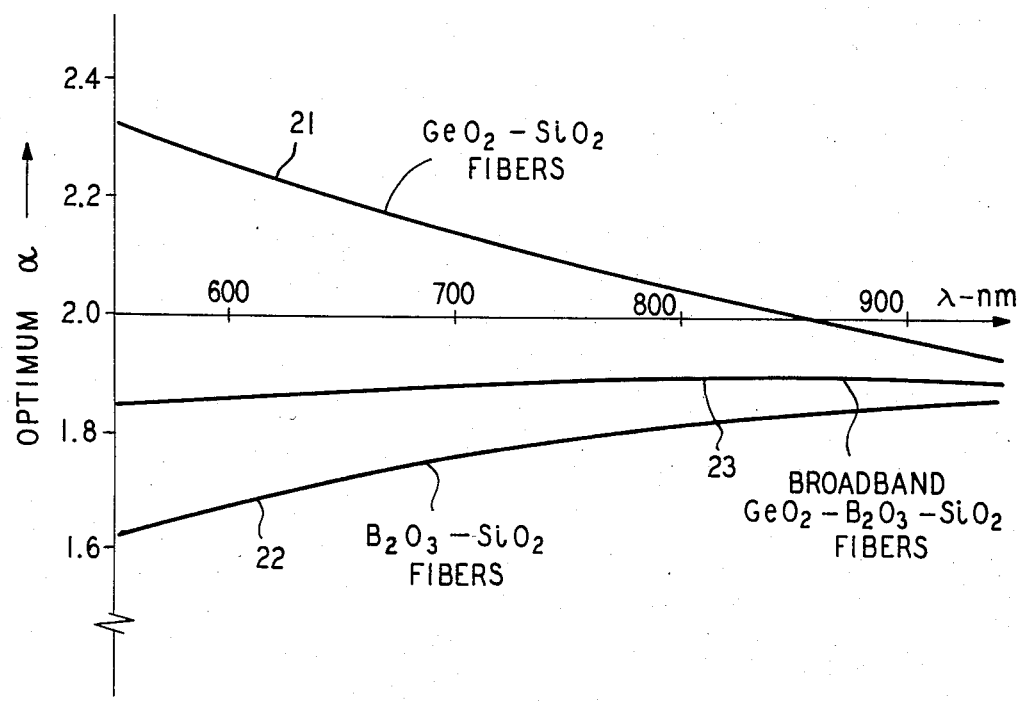
FIG. 2 shows typical curves of the optimum exponent of radial variation of index of refraction attributable to various doping techniques, including that of the invention.
Figure 3:
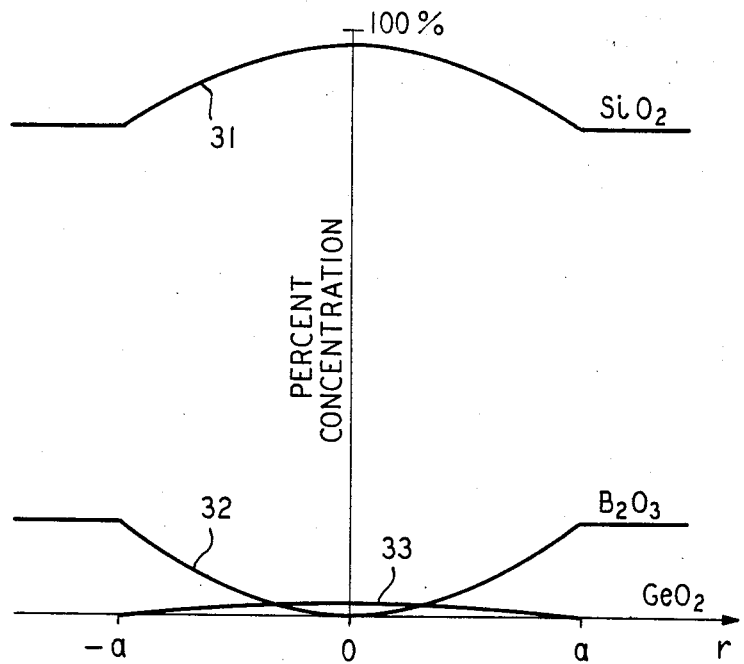
FIG. 3 shows typical curves of the relative concentrations of dopants and silica in the fiber of the invention.
Figure 4:
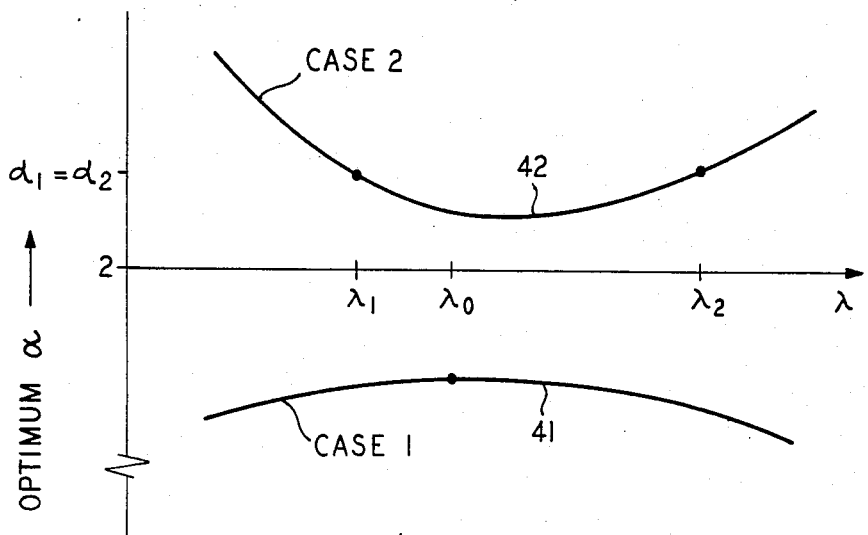
FIG. 4 shows curves illustrative of the optimum exponent of the radial variation of index for two different cases of simultaneously achieved optimized properties in an optical waveguiding fiber according to our invention.

The precise nature of these variations for specific illustrative examples of our invention are best understood by reference to the curves of FIGS. 2 - 4.

In FIG. 2, curve 21 shows the values of the optimum $\alpha$ with respect to wavelength for a fiber in which the refractive index of the core 14 is graded by varying a germania ($GeO_2$) glassy dopant from a relatively high concentration on the axis of core 14 to a relatively low concentration at the interface with cladding 12.

Curve 22 shows the variation with wavelength of optimum $\alpha$ for minimized intermode dispersion when the radial grading of index of the core 14 is achieved purely by variation of concentration of a glassy dopant of boron oxide ($B_2O_3$) in the majority silica matrix. In this known prior art case, the boron oxide typically varies from a minimum concentration on the axis of core 14 to a maximum concentration at the interface with cladding 12. Cladding 12 is provided with the same index by including similar boron oxide doping. Full advantage of boron oxide as a dopant is obtained by rapidly quenching the fiber at a particular rate and in a particular way to achieve a low index, as disclosed in the copending patent application of J. B. MacChesney-P. B. O'Connor Case 9-4, Ser. No. 444,705, filed Feb. 22, 1974. Curve 23 shows the variation with respect to wavelength of the optimum $\alpha$ according to our invention. It should be noted that curve 23 is relatively invariant or flat with respect to wavelength. In other words, the index variation is distinctly nonparabolic but is relatively wavelength independent. Broadly, tis is one case in which two optimized dispersion related properties are achieved simultaneously. The particular case of curve 23 is that of case 1 of FIG. 4 to be described hereinafter, in which not only is the intermode dispersion minimized at the selected transmission wavelength $\lambda_o$, typically about 0.8 micrometers ($10^4$ $\mu m$ = 1 cm), but also $d\alpha/d\lambda = 0$. In other words, the rate of change of $\alpha$ with respect to wavelength at the wavelength $\lambda_o$ is 0. Curve 41 has its maximum at the selected operating wavelength. This type of case will be compared more extensively with another example of our invention in the discussion hereafter of FIG. 4. In general, in either type of example, $\alpha$ can be equal to, greater than, or less than 2.

To achieve the flat $\alpha$ curve 23 of our invention and the simultaneous optimized properties that are characteristic of our invention, the glassy dopants germania and boron oxide are graded with respect to the majority matrix of pure fused silica with respect to displacement from the axis of the fiber as shown qualitatively in curves 31, 32 and 33 of FIG. 3. Curve 31 shows the percentage concentration of silica, the vertical axis representing the center of the fiber. In other words, the radial displacement $r$ increases in both directions from the vertical axis; and it is unimportant whether $r$ is considered to be positive or negative in either case. Curve 32 shows a similar variation with respect to displacement from the axis for the percentage concentration of boron oxide. Curve 33 shows corresponding variation in the percentage concentration of germania. The vertical scale of FIG. 3 is sufficiently accurate that an approximately operative embodiment of the invention can be reproduced from the relative variations of silica and dopants shown in curve 33, if the processing instructions of the above cited MacChesney et al application are also carefully followed.

Turning now to FIG. 4, we see an expanded version of curve 23 of FIG. 2 in the curve 41 of FIG. 4 which shows clearly that $d\alpha/d\lambda = 0$ at the selected operating wavelength $\lambda_o$ and that this curve of $\alpha$, the exponent of the radial variation of index, is surprisingly flat with respect to wavelength.

By changing the relative shapes of the germania and boron oxide percentage concentration curves, one can achieve minimized intermode dispersion at two distinct wavelengths, $\lambda_1$ and $\lambda_2$, as shown by curve 42 in FIG. 4. In this case, $\alpha$ is shown greater than 2 at all wavelengths of interest, but could also be less than or equal to 2. In any event, curve 42 has like values at wavelengths $\lambda_1$ and $\lambda_2$. To achieve the result of curve 42, it is necessary that both germania and boron oxide vary differently with radius than illustrated by curves 32 and 33 of FIG. 3.

It should be pointed out that our invention is not limited to the two foregoing examples. Not only will other functional variations of dopant concentrations achieve examples of minimized intermode dispersion at two distinct wavelengths, but there are also other dispersion-related properties which may be desirable to improve. For example, at extremes of wavelengths it may be desirable to increase dispersion and loss since these extreme wavelengths in the band may be characteristically those of undesired higher order modes. Still further, the shape of the concentration variations with radius may be drastically different from those shown in curves 32 and 33 in Equations 1 and 2 above if another glassy dopant is substituted for germania or is used together with germania to achieve the general doping shape of curve 33 of FIG. 3.

Still further, while it is generally desired that one of the multiplicity of glassy dopants be boron oxide, the concentration of which increases toward the cladding, it may also be that there are other glassy dopants which will permit the desired compensation. For example, if a dopant that provides decreasing index with increasing concentration is required, one might expect that small atomic weight elements of relatively large effective atomic radius could achieve this effect. Further, other as yet unstudied dopants with a silica-like structure may prove to have the needed refractive index and dispersion properties.

Moreover, while we have described two schemes of best equalization for optical transmission at a wavelength near 0.9 micrometers, it should be understood that wavelengths near 1.06 micrometers, or even in the range between 1.1 and 1.3 micrometers, may eventually be desired for optical communication links. If one looks at the curves 21, 22 for individual dopants, one can achieve the overall compensated doping curves, such as curve 23, may be substantially shifted in average $\alpha$ value by this shift in transmission wavelength. If one then wants to achieve a minimum of the $\alpha$ curve at the new selected transmission wavelength, it should be clear that concentration curves like curves 32 and 33 should be incrementally changed in shape to achieve the desired result.

The calculation of $\alpha(\lambda)$ for certain fiber compositions and the synthesis of fiber profiles to minimize the variation in $\alpha(\lambda)$ with $\lambda$ is treated below in detail.

It is often a good approximation to represent the structure-insensitive properties of a glass by a linear combination of contributions $G_m$ for the various components $m$. Let us consider a ternary glass system for which the previously defined profile function would be $$f(\lambda) = \delta g_1 G_1 + \delta g_2 G_2 + \delta g_3 G_3, \tag{1}$$

where $$g_1 + g_2 + g_3 = 1, \tag{2}$$

$$\delta g_1 + \delta g_2 + \delta g_3 = 0, \tag{3}$$

$$\delta g_m = g_m(r) - g_m(a), \tag{4}$$

and where $g_m(r)$ is the fractional concentration of the $m^{th}$ component and $a$ is the core radius.

It is known from R. Olshansky et al, *Topical Meeting on Optical Fiber Transmission*, Williamsburg, Va., Jan. 7–9, 1975, that $$\alpha \doteq 2 - 2P. \tag{5}$$

$$\text{Then, } P = \frac{f'}{\lambda f} = \frac{\delta g_1 G_1' + \delta g_2 G_2' + \delta g_3 G_3'}{\delta g_1 G_1 + \delta g_2 G_2 + \delta g_3 G_3} \tag{6}$$

or $$\frac{P}{\lambda} = \frac{\delta g_1 (G_1' - G_3') + \delta g_2 (G_2' - G_3')}{\delta g_1 (G_1 - G_3) + \delta g_2 (G_2 - G_3)} \tag{7}$$

where the prime indicates the wavelength derivative. It is clear from Equations (3) and (6) that in a fiber for which one $\delta g_m$ vanishes — either because $g_m(r) = g_m(a)$ or because the $m^{th}$ component is absent altogether — that $P(\lambda)$ is independent of the remaining $\delta g_m$. If, for example, $\delta g_3 = 0$, $$\frac{P}{\lambda} = \frac{G_1' - G_2'}{G_1 - G_2}, \tag{8}$$

and $P(\lambda)$ independent of $r$ and of the index profile $f$ in Equation (1).

A similar reduction of Equation (6) to (10) occurs in a situation where the ratio $$p = g_2(r)/g_3(r) = g_2(a)/g_3(a), \quad (9)$$

of two components is held constant. Then $$\frac{P}{\lambda} = \frac{A' - G_1'}{A - G_1} \quad (10)$$

with $$A = \frac{pG_2 + G_3}{1 + p}$$

This case corresponds to a binary system consisting of a profile component $G_1$ added to the host glass A such that $$f(\lambda) = (G_1 - A)\delta g_1. \quad 11.$$

For a binary system consisting of a profile component $G_1$ added to a general host glass having ($M$-1) components, $$A = \sum_{2}^{M} G_m(\delta g_m/\delta g_1) \quad (12)$$
$$= \sum_{2}^{M} G_m p_m$$

Although the bulk glasses may not have the same properties as the glasses employed in the fibers, existing bulk data provide an opportunity to use the preceding analysis to estimate fiber characteristics.

If we wish to design a fiber for which $\alpha(\lambda)$ does not vary appreciably near $\lambda = \lambda_o$, it is sufficient to require $$P'(\lambda_o) = 0. \quad (13)$$

If we specify $\Delta(\lambda_o)$ in addition, then the fiber can be realized in a ternary system, and the three differential concentrations $\delta g_m$ that synthesize the prescribed fiber can be calculated from these two constraints along with Equation (3). In order to be physically realizable, the solutions must satisfy $$|\delta g_m| \leq 1. \quad (14)$$

Consider a $GeO_2$-$B_2O_3$-$SiO_2$ ternary fiber. From Equation (7) we see that only differences $(G_1-G_3)$ and $(G_2-G_3)$ and their derivatives are needed. The quantities $(G_1-G_3)$ and $(G_2-G_3)$ are relatively insensitive to wavelength and to sample composition so that these data are taken from existing bulk data. On the other hand, calculations based on wavelength derivatives taken from existing bulk data give inconsistent results. Thus, we obtain $(G_1'-G_3')$ and $(G_1''-G_3'')$ from curve 21 in FIG. 2 and $(G_2'-G_3')$ and $(G_2''-G_3'')$ from curve 22. Then, for $$\lambda_o = 0.8\mu m, n = 1.5, \Delta = 6.7 \times 10^{-3}$$

$$(G_1-G_3) = 0.11 \quad (G_2-G_3) = -0.031$$

$$(G_1'-G_3') = -0.0035\mu m^{-1} (G_2'-G_3') = -0.0033\mu m^{-1}$$

$$(G_1''-G_3'') = 0.070\mu m^{-2} (G_2''-G_3'') = 0.012\mu m^{-2}$$

we calculate
$\delta g_1(0) = 0.02$, $\delta g_2(0) = -0.16$, $\delta g_3(0) = 0.14$ for $GeO_2$, $B_2O_3$ and $SiO_2$, respectively. The corresponding $\alpha(\lambda)$ curve is indicated by the curve 23 in FIG. 2 where it can be seen that $\alpha(\lambda)$ is flat over a considerable range of $\lambda$. The values of $g_1(a), g_2(a)$ and $g_3(a)$ in the cladding can be chosen for convenience. For example, with a cladding in which $g_1(a) = 0$, $g_2(a) = 0.16$ and $g_3(a) = 0.84$, we require $g_1(0) = 0.02$, $g_2(0) = 0$ and $g_3(0) = 0.98$. This result should be regarded only as illustrative of the computational method. In some specific cases, results are sensitive to the fiber material properties.

It is clear from the preceding example how one could design a ternary fiber profile so that $\alpha(\lambda)$ is optimum at two wavelengths $\lambda_1$ and $\lambda_2$. It is also clear that multicomponent glass fibers, for example, those with three or more dopants can be designed so as to prescribe additional properties, e.g., optimization at three wavelengths $\lambda_1$, $\lambda_2$ and $\lambda_3$.

If the linear approximation of Equation (1) is not valid, the mathematics becomes more difficult; but the principles of the profile synthesis remain the same.

What is claimed is:

1. A waveguiding optical fiber of the type comprising principally fused silica and having a core of radially-graded index associated with a graded density of a dopant, and a cladding surrounding said core, characterized in that the core includes at least one other dopant graded radially and said dopant gradings together achieve simultaneously minimum intermode dispersion at a first wavelength and another improved dispersion-related property of said fiber.

2. An optical fiber according to claim 1 in which one other dopant included in the core is graded simultaneously with respect to the first dopant to achieve substantially zero rate of change of the exponent of radial variation of index with respect to wavelength.

3. An optical fiber according to claim 2 in which a dopant is germania and the other dopant is boron oxide.

4. An optical fiber as claimed in claim 1 in which the other dopant included in the core is graded with respect to the first dopant to achieve minimized intermode dispersion at a second wavelength distinct from the first wavelength at which minimum intermode dispersion is obtained.

5. An optical fiber as claimed in claim 1 in which a dopant is germania and the other dopant is boron oxide, the values of concentration of germania being zero in the cladding and two per cent on axis in the core, the values of concentration of boron being 16 per cent in the cladding and zero per cent on axis in the core.

* * * * *